United States Patent [19]
Benz et al.

[11] 3,755,007
[45] Aug. 28, 1973

[54] STABILIZED PERMANENT MAGNET COMPRISING A SINTERED AND QUENCHED BODY OF COMPACTED COBALT-RARE EARTH PARTICLES

[75] Inventors: Mark G. Benz, Burnt Hills; Donald L. Martin, Elnora, both of N.Y.

[73] Assignee: General Electric Company, Schenectady, N.Y.

[22] Filed: Apr. 1, 1971

[21] Appl. No.: 130,108

[52] U.S. Cl. .................. 148/101, 148/102, 148/105, 148/31.57
[51] Int. Cl. ............................................. H01f 1/02
[58] Field of Search.................... 148/100, 101, 102, 148/103, 105, 31.57; 75/170, 0.5 BA

[56] References Cited
UNITED STATES PATENTS

| | | | |
|---|---|---|---|
| 3,560,200 | 2/1971 | Nesbitt et al. | 75/122 |
| 3,523,836 | 8/1970 | Buschow et al. | 148/31.57 |
| 3,546,030 | 12/1970 | Buschow et al. | 148/31.57 |
| 3,424,578 | 1/1969 | Strnat et al. | 75/213 |
| 1,677,139 | 7/1928 | Karcher | 148/112 |
| 3,655,463 | 4/1972 | Benz | 148/31.57 |
| 3,677,947 | 7/1972 | Ray et al. | 148/105 |
| 3,682,714 | 8/1972 | Martin | 148/101 |

*Primary Examiner*—L. Dewayne Rutledge
*Assistant Examiner*—W. R. Satterfield
*Attorney*—Charles T. Watts, Paul A. Frank, Jane M. Binkowski, Frank L. Neuhauser, Oscar B. Waddell and Joseph B. Forman

[57] ABSTRACT

A process for producing a novel cobalt-rare earth intermetallic permanent magnet material having a substantially stable magnetization at ambient temperatures above room temperature. A sintered cobalt-rare earth intermetallic product, in bulk or particulate form, is provided. The product is brought to quench temperature $T_Q$ ranging from about 750° C to 950° C and then it is fast cooled from said quench temperature $T_Q$ at a rate no less than about 75° C per minute to about room temperature.

8 Claims, 3 Drawing Figures

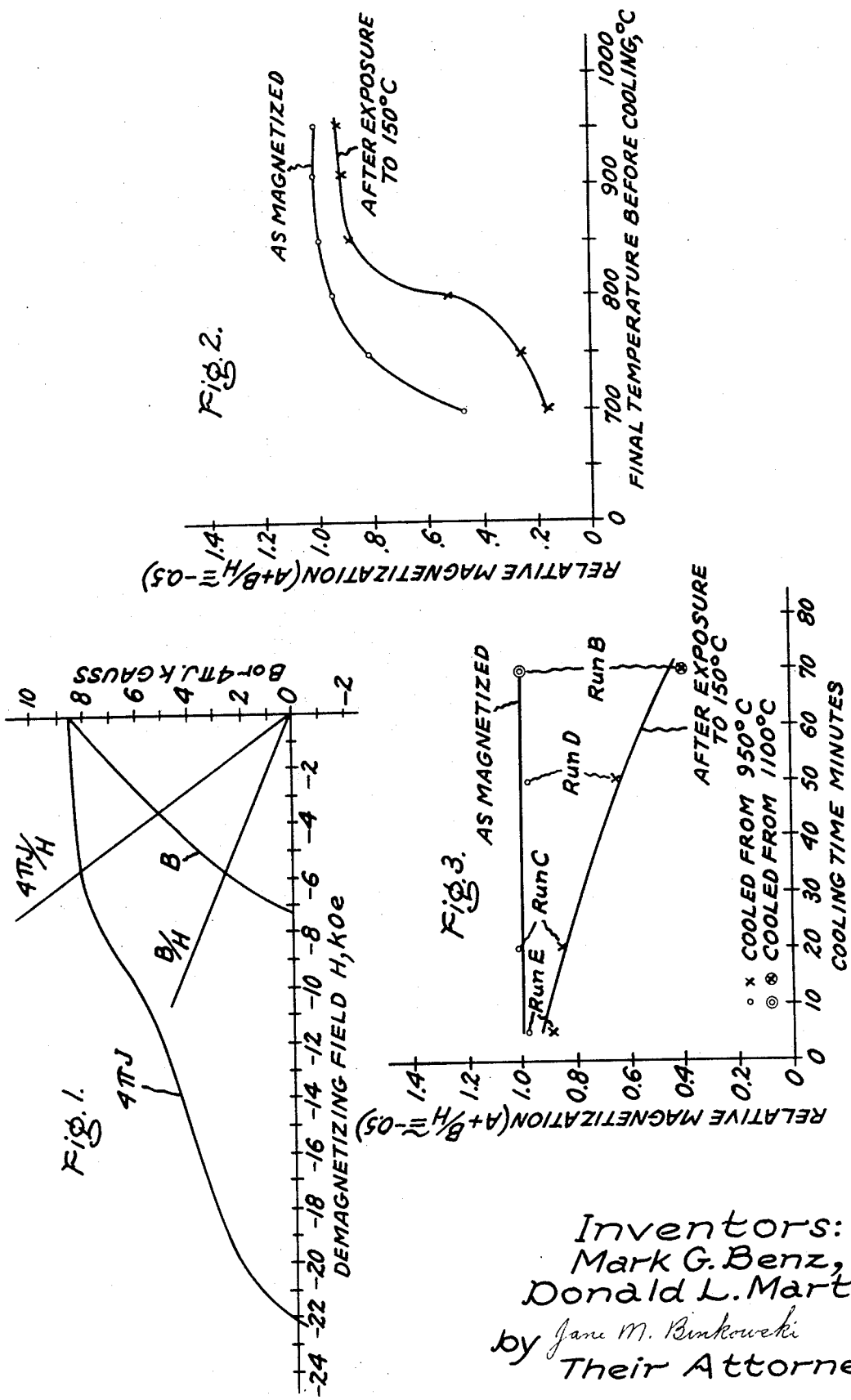

STABILIZED PERMANENT MAGNET COMPRISING A SINTERED AND QUENCHED BODY OF COMPACTED COBALT-RARE EARTH PARTICLES

STABILIZED PERMANENT MAGNET MATERIALS AND METHOD

The present invention relates generally to the art of making permanent magnets and is more particularly concerned with cobalt-rare earth permanent magnets having stable magnetic properties at temperatures above room temperature.

Permanent magnets, i.e., "hard" magnetic materials such as the cobalt-rare earth intermetallic compounds, are of technological importance because they can maintain a high, constant magnetic flux in the absence of an exciting magnetic field or electrical current to bring about such a field.

Within the past few years a new class of materials for making permanent magnets has been developed, based on cobalt and rare-earth elements. The improvement over prior art materials is so great that the cobalt-rare-earth magnets stand in a class by themselves. In terms of their resistance to demagnetization the new materials are from 20 to 50 times superior to conventional magnets of the Alnico type, and their magnetic energy is from two to six times greater. Since the more powerful the magnet for a given size is the smaller it can be for a given job, the cobalt-rare-earth magnets have applications for which prior art materials cannot even be considered.

Probably the most desirable property of a permanent magnet is that it provide useful external magnetic energy which is constant. This is important because in practically all applications such as a small motor or door latch, for example, the permanent magnet must function under a variety of demagnetizing influences.

When a permanent magnet material is magnetized, a magnetization value of $4\pi J$ gauss is established therein. The shape of the magnet or the magnetic circuit impose a demagnetizing field of H oersteds. Together, these properties, $4\pi J$ and H equal the flux density B which is also measured in gauss.

In the cobalt-rare earth permanent magnets, it has been found that ambient temperatures above room temperature act to demagnetize the magnet to some extent and magnetization is not completely recovered when the magnet cools back to room temperature. Frequently, the resulting loss in magnetization may range up to about 50 percent after the magnet is subjected to temperatures ranging up to 150° C or higher. This loss in magnetization can only be regained by remagnetizing the permanent magnet. However, remagnetization is time consuming, impractical or not possible to carry out once the permanent magnet has been assembled in an apparatus. In practice, some magnets are initially demagnetized a certain extent to stabilize their magnetization so that they will not suffer a loss in magnetization while in operation. Such initial demagnetization prevents the magnets from operating at their inherently higher magnetization values and is also time consuming.

It is an object of the present invention to treat sintered cobalt-rare earth intermatallic products to produce permanent magnets having a magnetization which is substantially stable at ambient temperatures above room temperature.

Those skilled in the art will gain a further and better understanding of the present invention from the detailed description set forth below, considered in conjunction with the figures accompanying and forming a part of the specification, in which:

FIG. 1 illustrates a demagnetization curve for a cobalt-samarium permanent magnet.

FIG. 2 is a graphical representation illustrating the substantially stable magnetization produced in cobalt-rare earth intermetallic permanent magnets fast cooled in accordance with the present invention from the claimed quench temperature after exposure to a temperature of 150° C.

FIG. 3 is a graphical representation illustrating how cooling rates effect the magnetization of a cobalt-rare earth permanent magnet before and after it has been heated to a temperature of 150° C.

In accordance with the present process, a sintered cobalt-rare earth intermetallic product suitable for use as a permanent magnet is cooled at a rapid rate from a temperature referred to herein as the quench temperature $T_Q$.

Briefly stated, the present process comprises providing a sintered cobalt-rare earth intermetallic product in bulk or particulate form, bringing said product to a quench temperature $T_Q$ ranging from about 750° C to 950° C, and fast cooling said product from said quench temperature $T_Q$ at a rate no less than about 75° C per minute to about room temperature.

The sintered cobalt-rare earth intermetallic product used in the present process may be prepared by a number of techniques. Briefly, the cobalt-rare earth intermetallic material is formed and converted to particulate form. The particles are compressed into a green body which is then sintered in a substantially inert atmosphere to produce a sintered body of the desired density.

Cobalt-rare earth intermetallic compounds exist in a variety of phases, but the $Co_5R$ intermetallic single phase compounds (in each occurrence R designates a rare earth metal) have exhibited the best magnetic properties, and generally, the present sintered products contain the $Co_5R$ phase in at least a significant amount.

Specifically, sintered products particularly useful in the present invention are disclosed in copending U.S. Pat. Applications Ser. No. 33,347 now U.S. Pat. No. 3,655,464, Ser. No. 33,348 now U.S. Pat. No. 3,655,463, and Ser. No. 33,224 now U.S. Pat. No. 3,695,945, all filed on Apr. 30, 1970 in the name of Mark G. Benz, and assigned to the assignee hereof, and all of which by reference are made part of the disclosure of the present application.

Each of the aforementioned copending patent applications discloses a process for preparing novel sintered cobalt-rare earth intermetallic products which can be magnetized to form permanent magnets having stable improved magnetic properties.

Briefly stated, in U.S. Pat. Application Ser. No. 33,347 now U.S. Pat. No. 3,655,464 a particulate mixture of a base CoR alloy and an additive CoR alloy, which R is a rare earth metal or metals is sintered to produce a product having a composition lying outside the $Co_5R$ single phase on the rare earth richer side. Specifically, the base alloy is one which at sintering temperature exists as a solid $Co_5R$ intermetallic single phase. Since the $Co_5R$ single phase may vary in composition, the base alloy may vary in composition which can be determined from the phase diagram for the particular cobalt-rare earth system, or empirically. The additive cobalt-rare earth alloy is richer in rare earth metal than the base alloy and at sintering temperature it is at least partly in liquid form and thus increases the sintering rate. The additive alloy may vary in composition and can be determined from the phase diagram for the particular cobalt-rare earth system or it can be determined empirically.

The base and additive alloys, in particulate form, are each used in an amount to form a mixture which has a cobalt and rare earth metal content substantially corresponding to that of the final desired sintered product since sintering causes little or no loss of these components. The additive alloy should be used in an amount sufficient to promote sintering, and generally, should be used in an amount of at least 0.5 percent by weight of the base-additive alloy mixture. The particulate mixture is compressed into a green body of the desired size and density. Preferably, the particles are magnetically aligned along their easy axis prior to or during compression since the greater their magnetic alignment, the better are the resulting magnetic properties.

The green body is sintered in a substantially inert atmosphere to produce a sintered body of desired density. Preferably, the green body is sintered to produce a sintered body wherein the pores are substantially non-interconnecting, which generally is a sintered body having a density of at least about 87 percent of theoretical. Such non-interconnectivity stabilizes the permanent magnet properties of the product because the interior of the sintered product or magnet is protected against exposure to the ambient atmosphere.

Sintering temperature depends largely on the particular cobalt-rare earth intermetallic material to be sintered, but it must be sufficiently high to coalesce the component particles. Preferably, sintering is carried out so that the pores in the sintered product are substantially non-interconnecting. For cobalt-samarium alloys, as well as most cobalt-rare earth alloys, a sintering temperature ranging from about 950° C to about 1200° C is suitable. Specifically, for cobalt-samarium alloys a sintering temperature of 1,100° C is particularly satisfactory.

The density of the sintered product may vary. The particular density depends largely on the particular permanent magnet properties desired. Preferably, to obtain a product with substantially stable permanent magnet properties, the density of the sintered product should be one wherein the pores are substantially non-interconnecting and this occurs usually at a density or packing of about 87 percent. Generally, for a number of applications, the density of the sintered product may range from about 80 percent to 100 percent. For example, for low temperature applications, a sintered body having a density ranging down to about 80 percent may be satisfactory.

The procedure for forming sintered products disclosed in U.S. Pat. Application Ser. No. 33,348 now U.S. Pat. No. 3,655,463, is substantially the same as that disclosed in U.S. Pat. Application Ser. No. 33,347 now U.S. Pat. No. 3,655,464, except that an additive CoR alloy which is solid at sintering temperature and which is richer in rare earth metal than the base alloy is used.

The procedure for forming the sintered products disclosed in U.S. Pat. Application Ser. No. 33,224 now U.S. Pat. No. 3,695,945, is substantially the same as that disclosed in U.S. Pat. Application Ser. No. 33,347 now U.S. Pat. No. 3,655,464, except that a cobalt-rare earth metal alloy of proper composition is initially formed.

When used in the present process, the sintered products of the referred to copending patent applications contain a major amount of the $Co_5R$ solid intermetallic phase, generally at least about 70 percent by weight of the product, and a second solid CoR intermetallic phase which is richer in rare earth metal content than the $Co_5R$ phase and which is present in an amount of up to about 30 percent by weight of the product. Traces of other cobalt-rare earth intermetallic phases, in most instances less than one percent by weight of the product, may also be present.

In addition, copending U.S. Pat. Application Ser. No. 86,288 now U.S. Pat. No. 3,684,593, entitled "Heat-Aged Sinjered Cobalt-Rare Earth Intermetallic Product and Process," filed on Nov. 2, 1970 in the names of Mark G. Benz and Donald L. Martin and assigned to the assignee hereof, is, by reference, made part of the disclosure of the present application. Briefly stated, in U.S. Ser. No. 86,288 now U.S. Pat. No. 3,684,593, there is disclosed a process for preparing heat-aged novel sintered cobalt-rare earth intermetallic products by providing a sintered cobalt-rare earth intermetallic product ranging in composition from a single solid $Co_5R$ phase to that composed of $Co_5R$ phase and a second phase of solid CoR in an amount of up to about 30 percent by weight of the product and richer in rare earth metal content than said $Co_5R$, and heat-aging said product at an aging temperature within 400° C below the temperature at which it was sintered to precipitate CoR phase richer in rare earth metal content than said $Co_5R$ in an amount sufficient to increase intrinsic and/or normal coercive force of said product by at least 10 percent, where R is a rare earth metal or metals. Heat-aging is carried out in an atmosphere such as argon in which the material is substantially inert. The precipitated CoR phase is generally present in an amount ranging from about 1 to 15 percent by weight of the product. These heat-aged sintered products are particularly useful in the present invention.

The rare earth metals useful in preparing the cobalt-rare earth alloys and intermetallic compounds used in forming the sintered products are the 15 elements of the lanthanide series having atomic numbers 57 to 71 inclusive. The element yttrium (atomic number 39) is commonly included in this group of metals and, in this specification, is considered a rare earth metal. A plurality of rare earth metals can also be used to form the present desired cobalt-rare earth alloys or intermetallic compounds which, for example may be ternary, quartenary or which may contain an even greater number of rare earth metals as desired.

Representative of the cobalt-rare earth alloys useful in forming the sintered products are cobalt-cerium, cobalt-praseodymium, cobalt-neodymium, cobalt-promethium, cobalt-samarium, cobalt-europium, cobalt-gadolinium, cobalt-terbium, cobalt-dysprosium, cobalt-holmium, cobalt-erbium, cobalt-thulium, cobalt-ytterbium, cobalt-lutecium, cobalt-yttrium, cobalt-lanthanum and cobalt-misch metal. Misch metal is the most common alloy of the rare earth metals which contains the metals in the approximate ratio in which they occur in their most common naturally occurring ores.

Examples of specific ternary alloys include cobalt-samarium-misch metal, cobalt-cerium-praseodymium, cobalt-yttrium-praseodymium, and cobalt-praseodymium-misch metal.

In the present process, the sintered product is brought to quench temperature $T_Q$ which ranges from about 750° C to 950° C. The particular quench temperature $T_Q$ is determinable empirically and depends largely on the specific sintered cobalt-rare earth product being fast-cooled.

In carrying out the present process, if the sintered product is at room temperature, it should be heated to quench temperature in an atmosphere in which it is substantially inert such as, for example, argon. When substantially the whole sintered product is at quench temperature $T_Q$, it is then fast cooled in accordance with the present process. For best results, the product is preferably fast cooled to about room temperature, and generally, such fast cooling should be completed in less than 10 minutes. A number of conventional techniques which cool substantially the whole specimen at a rate no less than 75° C per minute and which do not oxidize the material to any significant extent can be used. Representative of such techniques is liquid quenching and cooling in an atmosphere of an inert gas such as, for example, argon or nitrogen, preferably at room temperature. Preferably, the rate of cooling ranges from about 150° to 200° C or higher per minute, and preferably, it is accomplished in less than about 5 minutes. The rate of cooling, however, should not be so fast as to crack the sintered product if it is in bulk form.

Alternatively, the fast cooling of the present invention can be carried out directly after sintering or heat-aging. Specifically, upon completion of the sintering and/or heat-aging steps, the sintered product can be brought directly to quench temperature $T_Q$ and then fast cooled in accordance with the present invention.

When magnetized, the fast-cooled sintered material of the present invention is useful as a permanent magnet. The resulting permanent magnet has a substantially stable magnetization in air at ambient temperatures above room temperature and has a wide variety of uses. For example, the permanent magnets of the present invention are useful in telephones, electric clocks, radios, television, and phonographs. They are also useful in portable appliances, such as electric toothbrushes and electric knives, and to operate automobile accessories. In industrial equipment, the present permanent magnets can be used in such diverse applications as meters and instruments, magnetic separators, computers and microwave devices.

If desired, the fast-cooled sintered bulk material of the present invention can be crushed to a desired particle size preferably a powder, which is particularly suitable for alignment and matrix bonding to give a stable permanent magnet. On the other hand, the sintered bulk product can be initially crushed to a desired particle size, preferably a powder, and treated in accordance with the present process. The matrix material may vary widely and may be plastic, rubber or metal such as, for example, lead, tin, zinc, copper or aluminum. The powder-containing matrix can be cast, pressed or extruded to form the desired permanent magnet.

All parts and percentages used herein are by weight unless otherwise noted.

The invention is further illustrated by the following examples in which, unless otherwise noted, the conditions and procedure were as follows:

FIG. 1 shows a schematic curve of magnetization $4\pi J$ and induction B vs field H for a cobalt-samarium permanent magnet. This is the second quadrant of a complete hysteresis loop, and shows that positive values of $4\pi J$ and B the magnet can be maintained in the presence of a negative field H. A magnet will always have a certain constant ratio of B to H that can be calculated from its shape. This shape can be represented by a straight line from the origin and is called the B/H load line. In all the present examples, except one, the slope of the B/H load line is −0.5 indicating a permanent magnet with a very low length to diameter ratio. The equivalent $4\pi J/H$ load line has a slope of −1.5.

The magnetizing field was used to magnetically align along the easy axis.

All sintering was carried out in an inert atmosphere of purified argon and upon completion of the sintering, the sintered product was cooled in the same purified argon atmosphere.

The density of the green body as well as the sintered product is given as packing. Packing is the relative density of the material, i.e. it is a percent of theoretical. Packing was determined by a standard method using the following equation:

$$\frac{\text{Weight/Volume}}{8.5\text{g/cc.}} \times 100 = \% \text{ Packing}$$

where 8.5g/cc. is the density of $Co_5Sm$.

All heating and heat-aging were carried out in an inert atmosphere of purified argon.

EXAMPLE 1

A base alloy melt and an additive alloy melt of cobalt-samarium were made under purified argon by arc-melting and cast into ingots. The base alloy was formed from 33.3 weight percent samarium and 66.7 weight percent cobalt. The additive alloy was formed from 60 weight percent samarium and 40 weight percent cobalt. Each ingot was initially crushed by means of mortar pestle and then reduced by fluid energy "jet" milling to a powder ranging in size from approximately 1 to 10 microns in diameter and generally had an average particle size of about 6 microns.

30.0 grams of the base alloy were admixed with 6.42 grams of the additive alloy to form a mixture composed of 62.6 percent by weight cobalt and 37.4 percent by weight samarium.

A portion of the mixture was placed in a rubber tube and magnetically aligned therein along the easy axis by an aligning magnetizing field of 60 kilo-oersteds provided by an electromagnet. After magnetic alignment, it was pressed hydrostatically under a pressure of 200 K psi to form the green body. The green body was in the shape of a bar about one inch long and about one inch in diameter and had a packing of 80 percent.

The bar was sintered at a temperature of 1120° C for 1 hour. It was then transferred to a chamber having an atmosphere of argon at room temperature. Due largely to the size of this sintered bar, it cooled slowly and reached room temperature in one hour. The sintered bar had a packing of 91 percent.

At room temperature, the sintered bar was sliced into discs. Each disc was ground to produce a disc having a load line of approximately —0.5. The disks were approximately 1 inch in diameter and had a thickness ranging between about 0.1 and 0.2 inch.

In plotting the graphs in FIG. 2, one disk was used. Initially, the disk was magnetized at room temperature axially in the short direction along the easy axis using an applied magnetizing field of 60 kilo-oersteds, and its magnetization $4\pi J$ was determined in a conventional manner by means of a torque magnetometer to be approximately 8200 gauss. This value was assigned a value of 1.00 which is the magnetization given herein in relative units. Specifically, this relative magnetization value of 1.00 is the condition to which remaining magnetization measurements were normalized to determine their relative magnetization value.

The disk was then heated to a temperature of 950° C in a substantially inert atmosphere of argon. It was transferred to a chamber having an atmosphere of argon at room temperature, and it cooled to room temperature in about 5 minutes which amounts to a cooling rate in this instance of about 185° C per minute. After it was magnetized at room temperature in the short direction along the easy axis using an applied magnetizing field of 60 kilo-oersteds, its relative magnetization was determined to be 1.00. The disk was then heated to 150° C in an air oven and then cooled in air to room temperature. It was not remagnetized. Its relative magnetization was determined to be 0.91. This entire procedure was repeated except that instead of 950° C, the disk was heated to temperatures of 900° C, 850° C, 800° C, 750° C and 700° C. The results are shown in FIG. 2.

From FIG. 2 it can be seen that for this particular sintered product only quench temperatures ranging from 850° C to 950° C were effective in maintaining a substantially stable magnetization after the disk was raised to a temperature of 150° C.

EXAMPLE 2

In this example, it was determined how rates of cooling effect the stability of the magnetization of the permanent magnet at elevated temperatures. A sintered bar was prepared in the same manner as set forth in Example 1 and had the same composition and properties. Disks were formed from the bar in the same manner as set forth in Example 1. Rates of cooling were varied by stacking a number of disks together, i.e., the larger the stack the slower the rate of cooling. Relative magnetization herein was determined as set forth in Example 1.

Specifically, for each run made, the bar, disk or stacked disks were treated as set forth in Table I. All cooling in Table I was carried out in argon which was at room temperature and all cooling was carried out to room temperature, i.e. 25° C. After treatment, the bar, disk or stacked disks were magnetized at room temperature axially in the short direction along the easy axis using an applied magnetizing field of 60 kilo-oersteds and their relative magnetization was determined. The bar, disk or stacked disks were then heated to 150° C in an air oven and then allowed to cool to room temperature in air. The bar, disk or stacked disks were not remagnetized. Their relative magnetization was again measured in the same manner and the results were shown in Table I and FIG. 3.

TABLE I

| Run | Treatment | relative cooling rate | magnetization as magnetized (relative units) | % loss on exposure to 150°C |
|---|---|---|---|---|
| A | Sintered bar cooled from 1120°C to room temperature (25°C). | slow about 60 min. | 1.00 | 38 |
| B | 10 disks stacked together, heat-aged at 1100°C for 15 min. and cooled to room temperature. | slowest about 70 min. about 150°C/min. | 1.00 | 60 |
| C | Three disks stacked together, heat-aged at 1100°C for 15min., step-cooled in furnace to 1050°C, 1000°C and 950°C, then cooled to room temperature. | medium about 20 min. about 46°C/min. | 1.01 | 17 |
| D | Same as C except that 15 disks were stacked together. | slow about 50 min. about 18°C/min. | 0.97 | 34 |
| E | One disk heat-aged at 950°C for 15 min. and cooled to room temperature. | fastest About 5min. About 185°C/min. | 0.98 | 9 |
| F | Same as E except that a heat-aging temperature of 900°C was used. | fastest less than 5 min. 185°C/min. | 0.97 | 8.5 |
| G | Same as E except that a heat-aging temperature of 850°C. | fastest less than 5 min. 185°C/min. | 0.97 | 12 |

Runs E, F and G of Table I illustrate the present invention. Specifically, Table I and FIG. 3 show the significant extent to which magnetization is stabilized by the present process after the permanent magnet has been subjected to a temperature of 150° C.

EXAMPLE 3

In this example, the sintered body was prepared in substantially the same manner as set forth in Example 1 except that it had a composition of 63 percent cobalt and 37 percent samarium and a packing of 93.4 percent. In addition, the disks herein had a B/H load line of about −1.0 and a length to diameter ratio of 0.358.

One disk was heated from room temperature to a temperature of 1,100° C and maintained at that temperature for 20 minutes. It was then step-cooled to 750° C at 50° C intervals. The disk was then transferred to a chamber having an atmosphere of argon at room temperature where it cooled to room temperature in 9 minutes or about 80° C per minute. The disk was then magnetized at room temperature axially in the short distance along the easy axis using an applied magnetization field of 60 kilo-oersteds and its magnetization was determined by means of a torque magneto-meter. The disk was then heated to 150° C in an air oven and then allowed to cool to room temperature in air. It was not remagnetized. Its magnetization was again determined in the same manner and it showed a magnetization loss of 3.4 percent.

The above procedure was repeated with a second disk except that this time the disk was cooled from 1100° C to 1050° C and then fast cooled in the same manner at about 11 minutes at a rate of about 95° C per minute. In this instance, however, the disk lost about 19 percent magnetization after being raised to 150° C indicating the inoperability of a 1,050° C quench temperature.

What we claim as new and desire to secure by Letters Patent of the United States is:

1. A process for producing a sintered and quenched body of cobalt-rare earth intermetallic permanent magnet particles having a substantially stable magnetization in air at ambient temperatures ranging from above room temperature up to about 150° C which comprises providing a sintered cobalt-rare earth intermetallic body of compacted cobalt-rare earth intermetallic particles, said sintered body having a density ranging from about 87 to 100 percent and consisting essentially of a composition ranging from a single solid $Co_5R$ phase to that consisting essentially of $Co_5R$ phase and a second phase of solid CoR, said second phase of solid CoR being present in an amount of up to about 30 percent by weight of the body and richer in rare earth metal content than said $Co_5R$ phase, where R is a rare earth metal or metals, bringing said sintered body to a quench temperature $T_Q$ ranging from about 750° C to 950° C in an atmosphere in which it is substantially inert, and fast cooling said cobalt-rare earth body from said quench temperature $T_Q$ at a rate no less than about 75° C per minute to about room temperature.

2. A process for producing a sintered and quenched body of cobalt-rare earth intermetallic permanent magnet particles according to claim 1 wherein said sintered cobalt-rare earth intermetallic body is initially at about room temperature before being brought to quench temperature $T_Q$.

3. A process for producing a sintered and quenched body of cobalt-rare earth intermetallic permanent magnet particles according to claim 1 wherein said sintered cobalt-rare earth intermetallic body is at the temperature at which it was sintered before being brought to quench temperature $T_Q$.

4. A process for producing a sintered and quenched body of cobalt-rare earth intermetallic permanent magnet particles according to claim 1 wherein said sintered cobalt-rare earth intermetallic body is at a heat-aging temperature within 400° C below the temperature at which it was sintered before being brought to quench temperature $T_Q$.

5. A process for producing a sintered and quenched body of cobalt-rare earth intermetallic permanent magnet particles according to claim 1 wherein R is samarium.

6. A process for producing a sintered and quenched body of cobalt-rare earth intermetallic permanent magnet particles having a substantially stable magnetization in air at ambient temperatures ranging from above room temperature up to about 150° C which comprises providing a sintered cobalt-rare earth intermetallic body of compacted cobalt-rare earth intermetallic particles, said sintered body having a density ranging from about 87 to 100 percent and consisting essentially of solid $Co_5R$ intermetallic phase and a precipitated solid CoR phase richer in rare earth metal content than said $Co_5R$ phase in an amount ranging from about 1 to 15 percent by weight of said body, where R is a rare earth metal or metals, bringing said body to a quench temperature $T_Q$ ranging from about 750° C to 950° C in an atmosphere in which it is substantially inert, and cooling said cobalt-rare earth body from said quench temperature $T_Q$ at a rate no less than about 75° C per minute to about room temperature.

7. A sintered and quenched body produced by the process of claim 1.

8. A sintered and quenched body produced by the process of claim 6.

* * * * *